J. L. CLENDENON.
HUB FOR GEARS, PULLEYS, AND TOOLS.
APPLICATION FILED AUG. 5, 1920.
1,392,915.  Patented Oct. 11, 1921.
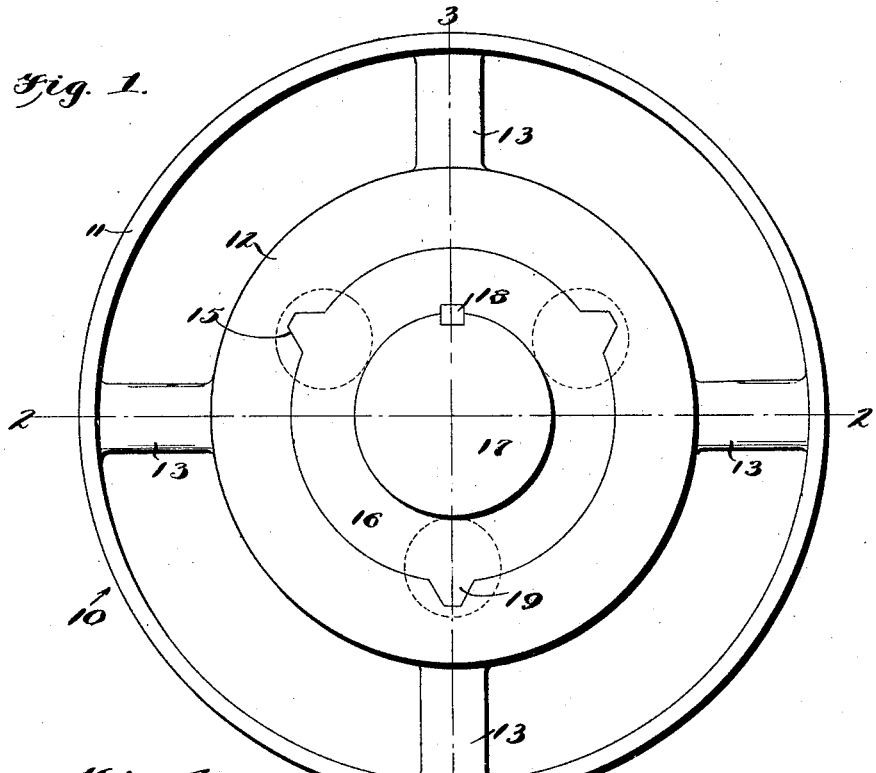
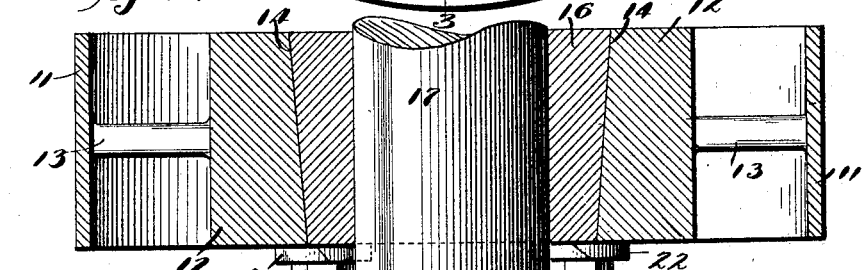
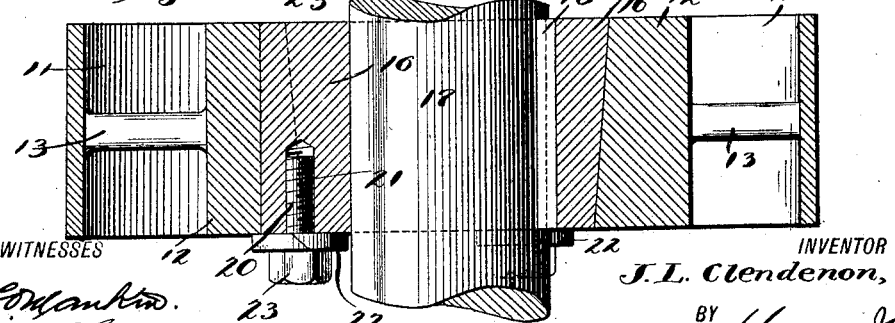
INVENTOR
J. L. Clendenon,
ATTORNEYS

UNITED STATES PATENT OFFICE.

JAMES LOUIS CLENDENON, OF ENSLEY, ALABAMA.

HUB FOR GEARS, PULLEYS, AND TOOLS.

1,392,915.  Specification of Letters Patent.  Patented Oct. 11, 1921.

Application filed August 5, 1920 Serial No. 401,461.

*To all whom it may concern:*

Be it known that I, JAMES LOUIS CLENDENON, a citizen of the United States, and a resident of Ensley, in the county of Jefferson and State of Alabama, have invented certain new and useful Improvements in Hubs for Gears, Pulleys, and Tools, of which the following is a specification.

This invention relates to novel and useful improvements in gears, pulleys and the like or tools and more particularly to an improved hub construction therefor, by which the body or rim of the gear, pulley or tool is detachably fixed to the hub, so that the part subject to wear and tear may be removed for repair or renewal in case of breakage, or for changing speeds where the same hub may be used for different sizes of gears or the like, the same hub being usable with different gears, pulleys or tools.

A further object of the invention is to provide improved means by which the body of the tool may be secured to the hub and prevented from turning or becoming displaced, the device being simple in construction, economical to produce and not likely to get out of working order.

Other and further objects of my invention will become readily apparent to persons skilled in the art, from a consideration of the following description when taken in conjunction with the accompanying drawings, wherein:

Figure 1 is a side elevation of a pulley equipped with the improved hub construction, Fig. 2 is a diametrical sectional view taken across the line 2—2 of Fig. 1, and Fig. 3 is a similar view taken on the line 3—3 of Fig. 1.

Referring to the drawings in detail, in which like reference characters designate corresponding parts through the several views, the numeral 10 designates a pulley having an outer rim 11 and an inner rim 12 connected thereto by spokes 13, said inner rim being provided with a tapered bore 14 having at its inner surface, a series of tapered grooves or keyholes 15, preferably three in number and equi-distantly spaced apart. The keyholes or grooves are also tapered in cross section toward the periphery of the inner rim 12, that is, they are wider at their open sides to insure a wedge-tight fit.

The numeral 16 designates a sleeve-like hub mounted on a shaft or spindle 17 and adapted to rotate therewith, said hub being fixed to the shaft in any suitable manner as by means of a spline or key 18 fitting corresponding grooves in the hub and shaft. The hub is tapered to fit the bore 14 and at its periphery, is provided with a plurality of equi-distantly spaced keys or projections 19 running longitudinally or axially to correspond with the grooves 15 and located in similarly spaced relation so as to engage therein longitudinally. By this means, the tool or instrument fitted on the hub will be retained thereon, the two being firmly held together through the medium of threaded studs or screws 20 engaged in threaded sockets 21 in one end of the hub and engaging the adjacent end of the inner rim or tool at the end toward which the latter would be displaced. Washers 22 are mounted on said studs or screws and engaged by a lock or jam nut 23 so that the washers may be held against the end face and in overlapping relation with respect to the inner rim, thus positively securing the latter against displacement. Thus, it will be seen that inasmuch as the tool or pulley is firmly held in position against turning by the interlocking keys and grooves, thus preventing the inner rim from turning on the hub, the said rim will be additionally held from displacement, the fact that the rim is prevented from turning serving to prevent loosening of the nuts and screws which serve to prevent longitudinal separation or displacement of the rim and hub one with reference to the other.

In making reference to the pulley, it is to be understood that a gear or other tool may be substituted and that the shaft may be the shank of said tool, the fastening means being the same, and the tool, gear or pulley being capable of being readily renewed in case of breakage, repaired or changed for alteration of the size for changeable or variable speeds. That is, the working part of the rim or tool, especially in the case of a gear or pulley, is separable and renewable.

In view of the foregoing, it is thought that the operation of the device will be readily understood, and in view of the simplicity and practical value, that it will commend itself to those skilled in the art.

Having thus described my invention, what I claim is:—

1. The combination with a spindle and a hub fixed thereon against rotation; of a rim provided with a series of longitudinally and cross sectionally tapered longitudinal grooves, said hub having longitudinally and cross sectionally tapered keys engaging said grooves to prevent said rim turning on the hub, and means carried by the hub and engaging one end of the rim to prevent displacement of the rim axially from the hub.

2. In a hub for gears, pulleys, tools and the like, the combination with a circular ringlike body having a bore provided with tapered longitudinal grooves; of a hub adapted to engage a spindle in fixed relation and having a series of tapered longitudinal keys engaging said grooves to prevent turning of the body on the hub, and means carried by one of said elements and engaging the other element to prevent axial displacement of one with respect to the other.

3. In a hub for gears, pulleys, tools and the like, the combination with a circular ringlike body having a bore provided with tapered longitudinal grooves; of a hub adapted to engage a spindle in fixed relation and having a series of tapered longitudinal keys engaging said grooves to prevent turning of the body on the hub, and means carried by one end of said hub and engaging the adjacent ends of the hub and body to prevent longitudinal separation of one with respect to the other.

4. The combination with a body including a rim provided with a bore having a series of spaced longitudinal keyways enlarged toward the bore thereof; of a hub having keys fitting said keyways, screws engaged in sockets in said hub at one end thereof, washers mounted on said screws and overlapping the end of the rim, and nuts engaged on said screws to secure said washers in position.

5. The combination with a rim of a gear, pulley or tool, and provided with a tapered bore, of a hub tapered to fit said bore, means coacting between the hub and rim to prevent turning of the rim on the hub, a spindle to which said hub is fixed against turning, said hub having sockets in one end, studs engaged in said sockets and enlargements held on said studs and overlying the inner edge of the rim to secure the latter firmly in position.

6. The combination with a body including a rim provided with a bore having a series of spaced longitudinal key-ways enlarged toward the bore thereof; of a hub having keys fitting in said key-ways, and means engaged in the hub at one end thereof and overlapping the end of the rim to prevent displacement of the rim axially from the hub.

JAMES LOUIS CLENDENON.